United States Patent
Redick

(10) Patent No.: US 9,078,414 B1
(45) Date of Patent: Jul. 14, 2015

(54) PET WASHING APPARATUS

(71) Applicant: Kevin L. Redick, Homewood, IL (US)

(72) Inventor: Kevin L. Redick, Homewood, IL (US)

(*) Notice: Subject to any disclaimer, the term of this patent is extended or adjusted under 35 U.S.C. 154(b) by 0 days.

(21) Appl. No.: 14/563,344

(22) Filed: Dec. 8, 2014

(51) Int. Cl.
*A01K 13/00* (2006.01)
*A47K 3/32* (2006.01)

(52) U.S. Cl.
CPC *A01K 13/001* (2013.01); *A47K 3/32* (2013.01)

(58) Field of Classification Search
CPC ......... A47K 3/32; A47K 3/06; A61G 7/1003; A01K 13/001
USPC ......... 119/671, 673, 753, 674, 474, 513, 499, 119/498, 754, 756, 757, 755; 4/564.1, 4/565.1, 566.1, 568, 570, 599, 600
See application file for complete search history.

(56) References Cited

U.S. PATENT DOCUMENTS

| | | | | |
|---|---|---|---|---|
| 689,164 | A * | 12/1901 | Castle | 4/599 |
| 1,897,321 | A * | 2/1933 | Mitchell et al. | 108/4 |
| 2,265,105 | A * | 12/1941 | Farrington | 108/4 |
| 3,577,936 | A * | 5/1971 | Emery | 108/8 |
| 3,848,279 | A * | 11/1974 | Ipsen, Jr. | 5/113 |
| 3,935,600 | A * | 2/1976 | Scribner | 4/495 |
| 4,557,002 | A * | 12/1985 | Schmidt | 4/564.1 |
| 4,741,289 | A * | 5/1988 | Blose | 119/671 |
| 4,782,792 | A * | 11/1988 | Anthony et al. | 119/665 |
| 4,803,951 | A * | 2/1989 | Davis | 119/497 |
| 4,858,561 | A * | 8/1989 | Springer | 119/165 |
| 4,975,992 | A * | 12/1990 | Patterson et al. | 4/599 |
| 5,662,069 | A * | 9/1997 | Smith | 119/665 |
| 5,937,452 | A * | 8/1999 | Brewer | 4/460 |
| 5,974,601 | A * | 11/1999 | Drane et al. | 4/539 |
| 6,155,206 | A * | 12/2000 | Godshaw | 119/453 |
| 6,553,943 | B1 * | 4/2003 | Murphy | 119/673 |
| 6,866,009 | B2 * | 3/2005 | Smith et al. | 119/840 |
| 7,044,086 | B2 * | 5/2006 | Fisher | 119/843 |
| 7,228,820 | B1 * | 6/2007 | Kellogg et al. | 119/498 |
| 7,231,891 | B2 * | 6/2007 | Wood | 119/498 |
| 7,241,250 | B1 * | 7/2007 | French et al. | 482/54 |
| 7,322,315 | B2 * | 1/2008 | Brewer et al. | 119/498 |
| 7,387,084 | B2 * | 6/2008 | Hildenbrand et al. | 119/165 |
| 7,703,416 | B2 * | 4/2010 | Farmer et al. | 119/474 |
| 7,789,044 | B2 * | 9/2010 | McGrade | 119/496 |
| 7,802,540 | B2 * | 9/2010 | Jakubowski et al. | 119/499 |
| 7,913,652 | B1 * | 3/2011 | Lutz | 119/674 |
| 7,921,812 | B1 * | 4/2011 | Carrillo | 119/604 |
| 8,061,304 | B1 * | 11/2011 | Ramsay et al. | 119/671 |
| 8,069,821 | B1 * | 12/2011 | Green | 119/671 |
| 8,117,993 | B2 * | 2/2012 | Farmer et al. | 119/499 |
| 8,267,477 | B1 * | 9/2012 | Appiah Finn | 297/423.41 |

(Continued)

*Primary Examiner* — Yvonne Abbott-Lewis

(57) ABSTRACT

A self-contained pet washing and grooming apparatus is disclosed. The apparatus includes a base, a top member which is a grooming compartment with a blower/dryer, side supports, a flexible side wall and a reservoir for clean and waste water. In various embodiments, water is filled through both a tube on the reservoir and from a water source such as a sink faucet. The water line is attached to a nozzle. A drain tray is placed over the base so that water used within the apparatus drains through the drain tray into the base to the reservoir. A pump is provided in the reservoir to pump water out of the base through a water exit line, for example, to a spray nozzle. The device has a power source, and is collapsible such that the drain tray, side support and grooming compartment all collapse and fit within the base. Extension legs attached underneath the reservoir are also collapsible. Optionally, the reservoir has a handle and wheels.

19 Claims, 10 Drawing Sheets

(56) References Cited

U.S. PATENT DOCUMENTS

| | | | |
|---|---|---|---|
| 8,276,546 B2 * | 10/2012 | Makarian et al. | 119/671 |
| 8,413,610 B1 * | 4/2013 | Fultz | 119/665 |
| 8,453,607 B2 * | 6/2013 | Carter | 119/461 |
| 8,720,380 B1 * | 5/2014 | Skirbe | 119/600 |
| 8,757,097 B1 * | 6/2014 | Autumn | 119/665 |
| 2007/0079766 A1 * | 4/2007 | Park | 119/674 |
| 2007/0289548 A1 * | 12/2007 | Smoot | 119/668 |
| 2007/0295285 A1 * | 12/2007 | Smith et al. | 119/753 |
| 2009/0300844 A1 * | 12/2009 | Taylor | 5/607 |

* cited by examiner

PET WASHING APPARATUS

CROSS-REFERENCE TO RELATED APPLICATIONS

This application is a continuation in part of application Ser. No. 13/676,312 filed on Nov. 14, 2012, which is a continuation in part of application Ser. No. 12/701,514 filed on Feb. 5, 2010, now U.S. Pat. No. 8,371,248 which claims priority to Provisional Application No. 61/150,170, filed Feb. 5, 2009, which is hereby incorporated by reference herein in its entirety.

FIELD OF THE INVENTION

The present invention relates to an apparatus for washing a pet, and more particularly, to a self-contained pet washing and grooming apparatus that is compact, collapsible and has its own power source. The apparatus has a grooming compartment for the storage of grooming tools, a blower/dryer to dry a wet animal, and extension legs for flexibility with bathing or grooming an animal. The apparatus also has a reservoir for clean and waste water.

BACKGROUND

Various devices have been used for grooming or bathing pets. For example, U.S. Pat. No. 5,213,064, issued to Mondine et al., discloses an animal bath apparatus. The apparatus is shaped like a box. While the device could be used to bathe a pet from the top, it does not provide for drainage of used bath water nor does it connect to a sink faucet. Furthermore, it is not collapsible and thus it is cumbersome to move around and takes up significant storage space. It also does not provide a power source, grooming compartment or extension legs.

U.S. Pat. No. 5,243,931, issued to McDonough, discloses a tub to be used for washing an animal. However, again, the device takes up significant space and drainage is through the bottom only. Additionally, it does not connect to a sink faucet, is not collapsible and does not provide a power source, grooming compartment or extension legs.

Numerous other apparatus have been proposed. However, none of them is particularly compact, provide a self-contained unit or offer grooming convenience. They also do not provide a useful way to handle drainage nor drying capabilities and do not have their own power source or reservoir for clean and waste water.

Thus, there remains a need for a pet washing and grooming apparatus which is collapsible, compact, easily portable, and provides a convenient and sanitary way to wash and groom a pet.

SUMMARY

The present invention is a self-contained pet washing and grooming apparatus. The apparatus provides a convenient and sanitary device to wash and groom a pet, such as a dog or other animal, in a portable and collapsible unit.

The pet washing and grooming apparatus of the present invention includes a base, a top member which is a grooming compartment with a blower/dryer and a power source. The apparatus includes tie-down rings on the top member. The apparatus also includes side support members. Below the base is a reservoir for clean and waste water. The side support members, ideally rigid rod supports, such as a scissor lift or telescoping lift, are collapsible and fit within a track in the base. The power source is attached to the inside of the grooming compartment and the outside of the base. The top member and rigid rod supports can be collapsed to fit within the base, making the apparatus very compact, portable, and easy to store. Extension legs that fit within a track underneath the reservoir and top member are also collapsible.

A water line is used to bring water from a water source to a water line adapter which then goes to a water dispensing device such as a spray nozzle. The nozzle may be mounted to the top member, and may be movable and removable. The water line can include a tube which can be internally or externally connected to a water source such as a sink faucet or an internal reservoir.

In various embodiments, the top member is divided into a top and bottom section. The top section functions as a cover and a grooming compartment for storage. The grooming compartment may be used to store grooming tools, such as clippers, shampoo or other accessories. The grooming compartment also has a power source that can be used for grooming tools. The top member may have tie-down rings to secure a pet with straps or some other device. The grooming compartment may have a handle to detach the grooming compartment from the apparatus. The bottom section of the compartment incorporates a blower/dryer and may have a vacuum unit.

A flexible side wall extends from the top member down to the base. In various embodiments, the side wall is a curtain similar to a shower curtain. One or more holes may be provided in the curtain to allow a user to pass his or her hands through the holes to access the nozzle to wash and groom a pet. The curtain is movably and removably mounted on a track in the top member.

The reservoir may separately retain clean and waste water. Clean water is extracted from a clean water section of the reservoir utilizing a pump to the spray nozzle. The base has a cavity where waste water is drained from the drain tray into the waste water section of the reservoir. The base may have tie-down anchors to enable a user to secure a pet with straps or some other device.

In various embodiments, the apparatus includes a drain tray which covers a cavity in the base. The drain tray has drain holes in it to allow used water to drain through a screen to the cavity of the base. From there, water drains into the waste water reservoir.

The reservoir may further include extension legs so that the height of the unit can be adjusted by a user, and a handle and a pair of wheels so that the unit can be easily moved, especially in a collapsed mode. The extension legs may be controlled manually or by power.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

DETAILED DESCRIPTION OF THE INVENTION

Figure 1:
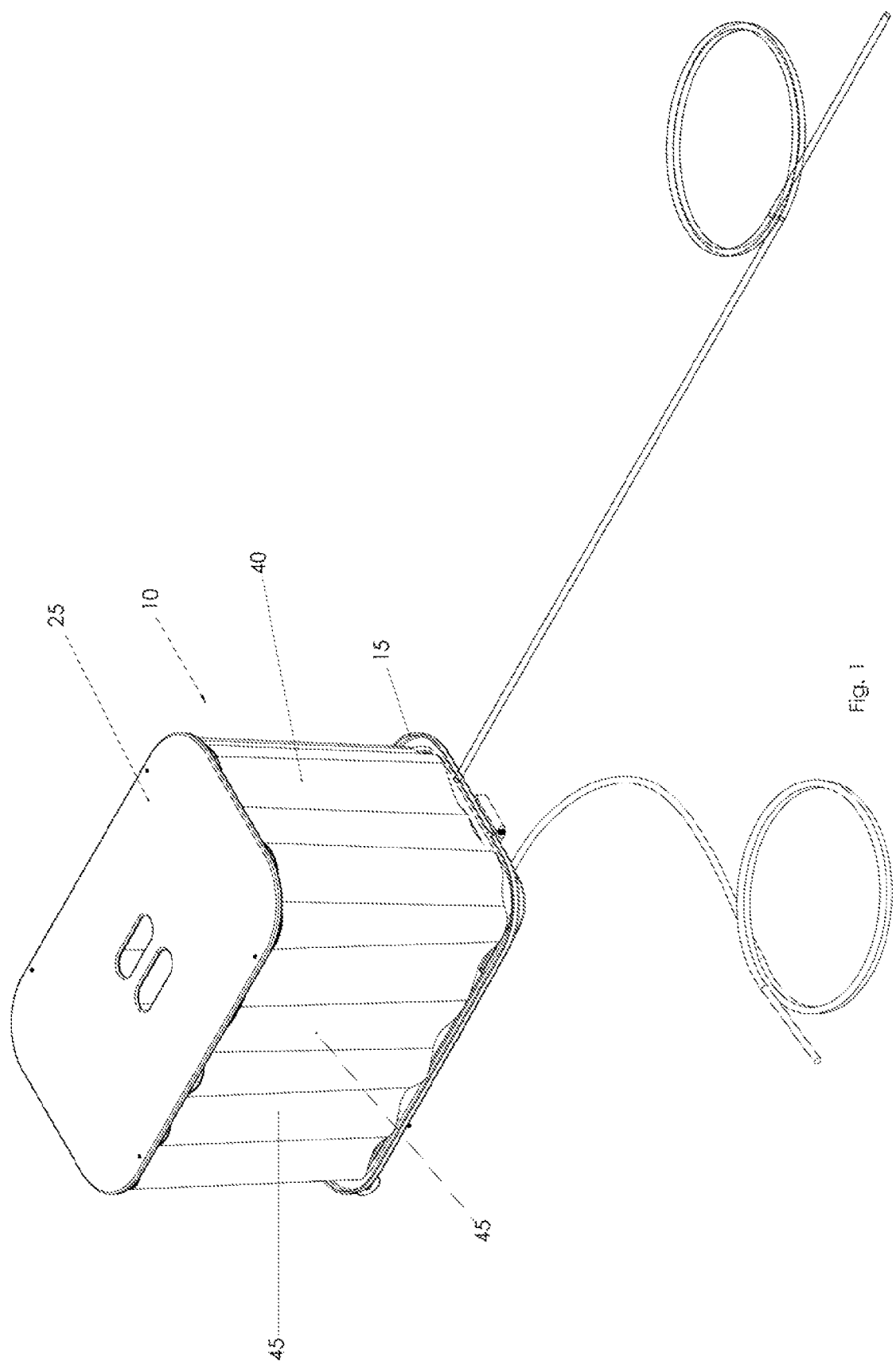
FIG. 1 shows a perspective view of the apparatus of the present invention.
Figure 2:
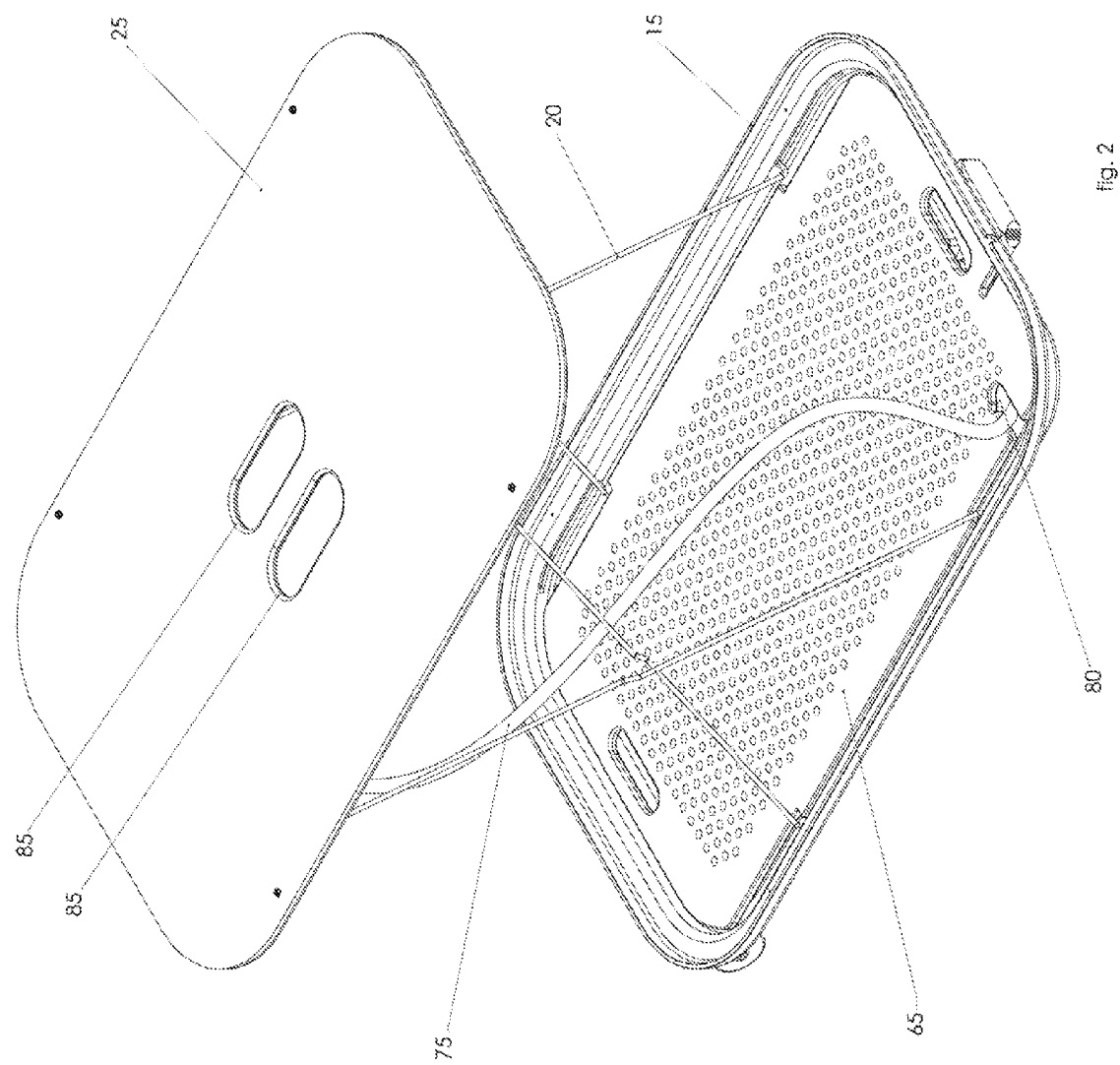
FIG. 2 shows another perspective view of the apparatus of the present invention without the flexible side wall attached.
Figure 3:
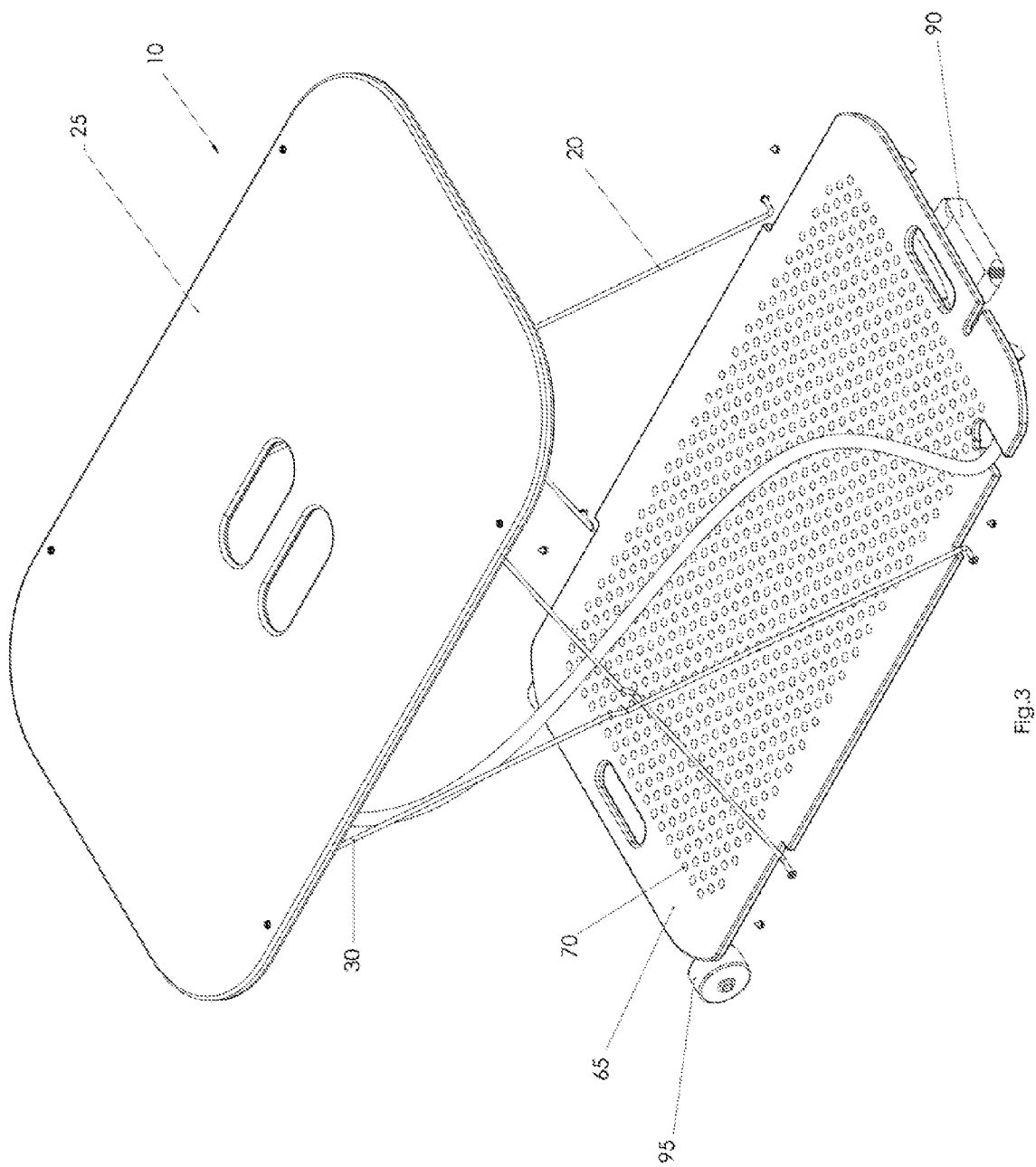
FIG. 3 shows a perspective view of the apparatus of the present invention without the base.
Figure 4:
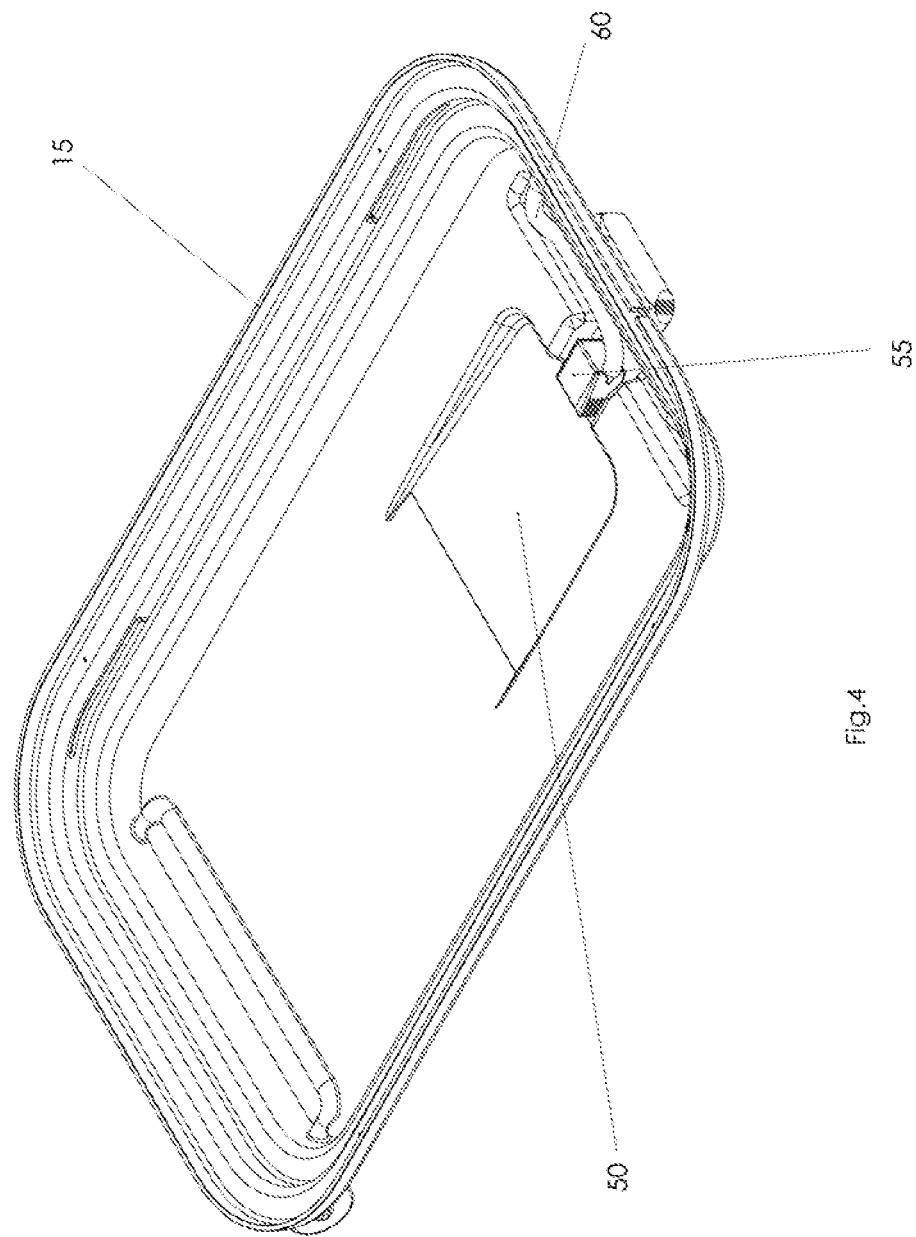
FIG. 4 shows a perspective view of the base of the apparatus of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is a self-contained pet washing and grooming apparatus 10. The apparatus includes a base 15 which is substantially impermeable to water. A first side support member 20 extends upward from the base 15 to top member 25. In various embodiments, a second side support member 30 extends upward from the base 15 to top member 25. First and second side support members extend diagonally between base 15 and top member 25. Together, side support members 20 and 30 may form rigid rod supports such as a scissor lift or telescoping lift and have two ends with a first end connected to and extending from base 15. In various embodiments, a second end is connected to and substantially supports top member 25.

Figure 5:
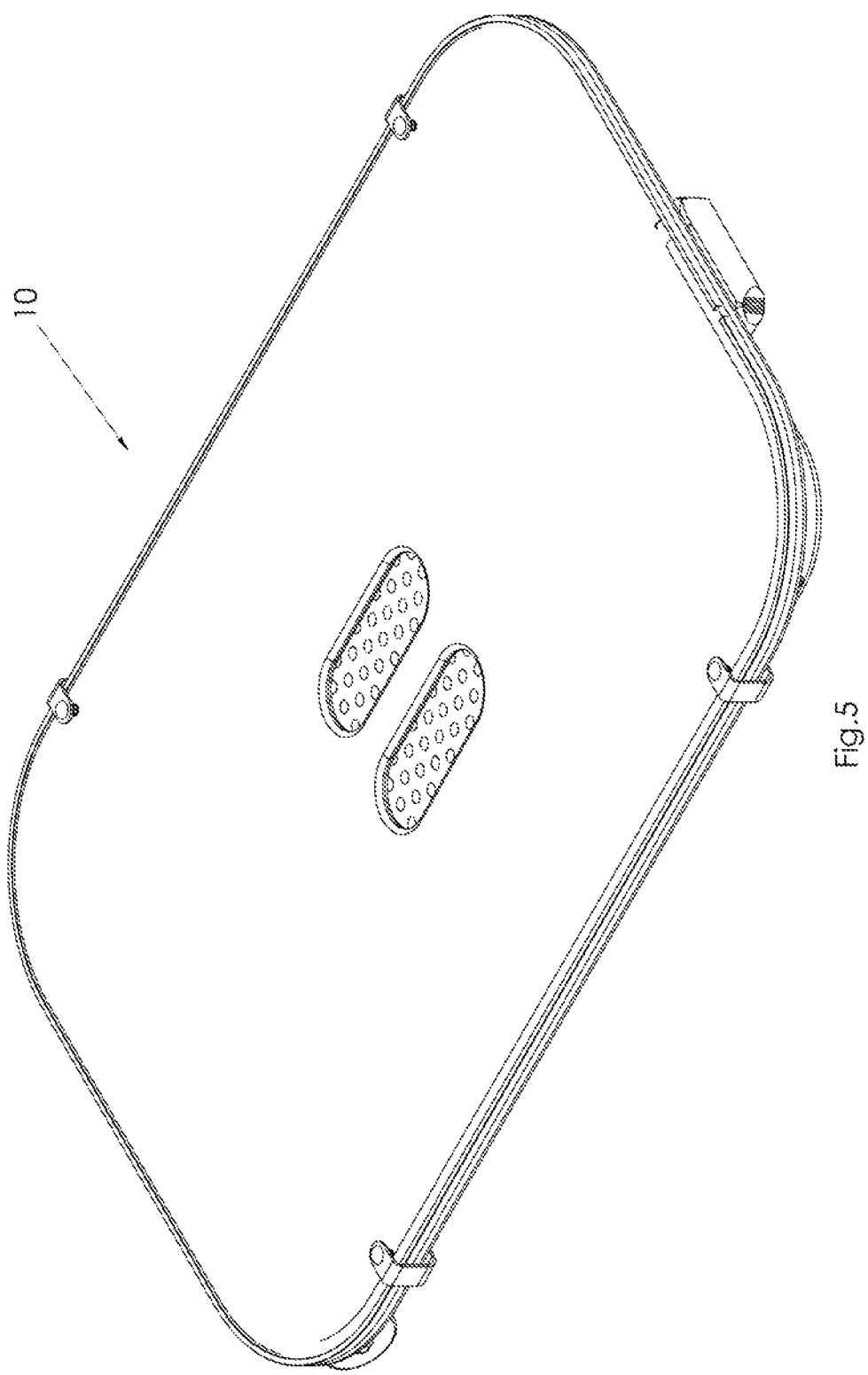
FIG. 5 shows a perspective view of the apparatus of the present invention in collapsed form.
Figure 6:
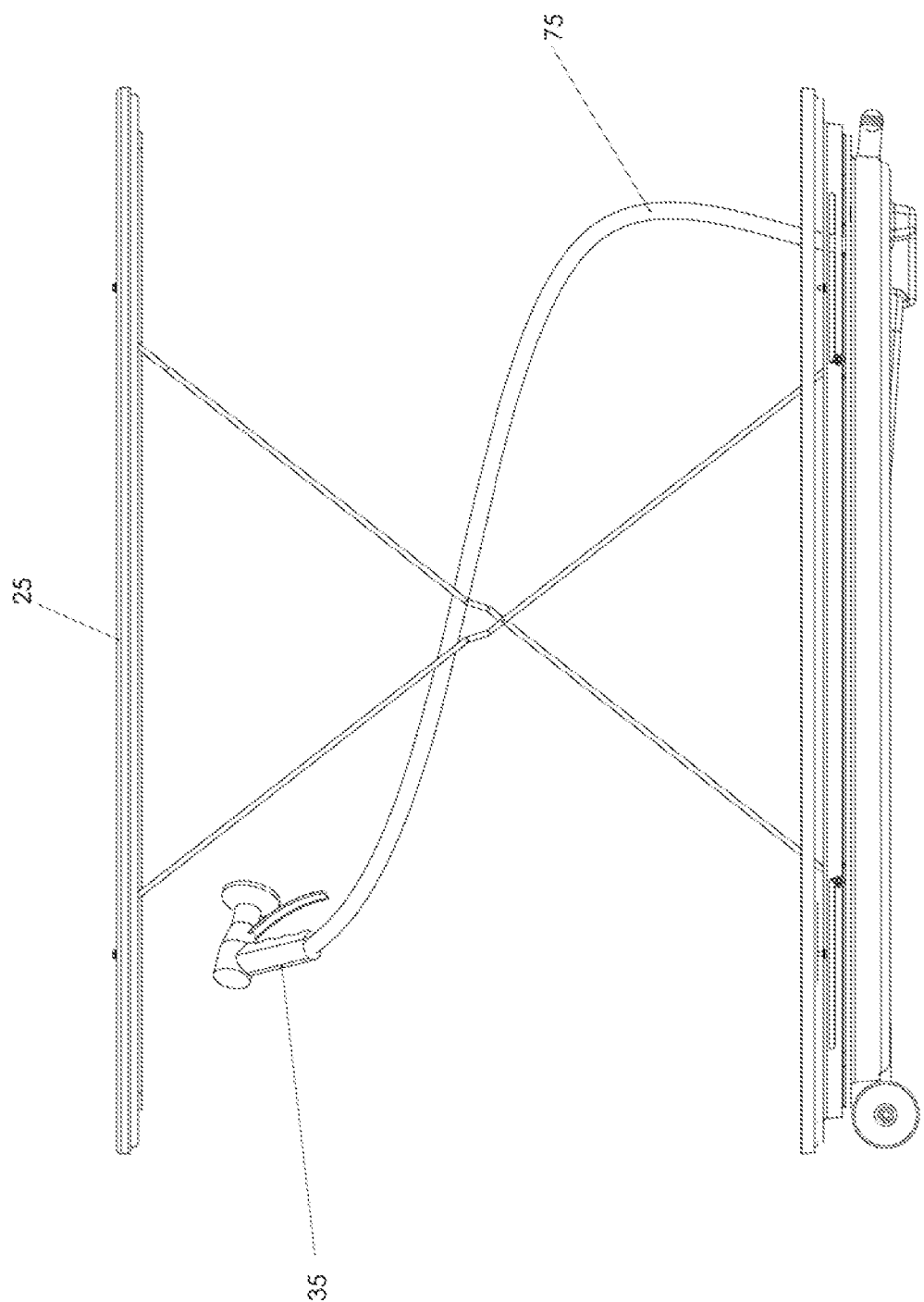
FIG. 6 shows a side view of the apparatus of the present invention without the side wall.
Figure 7:
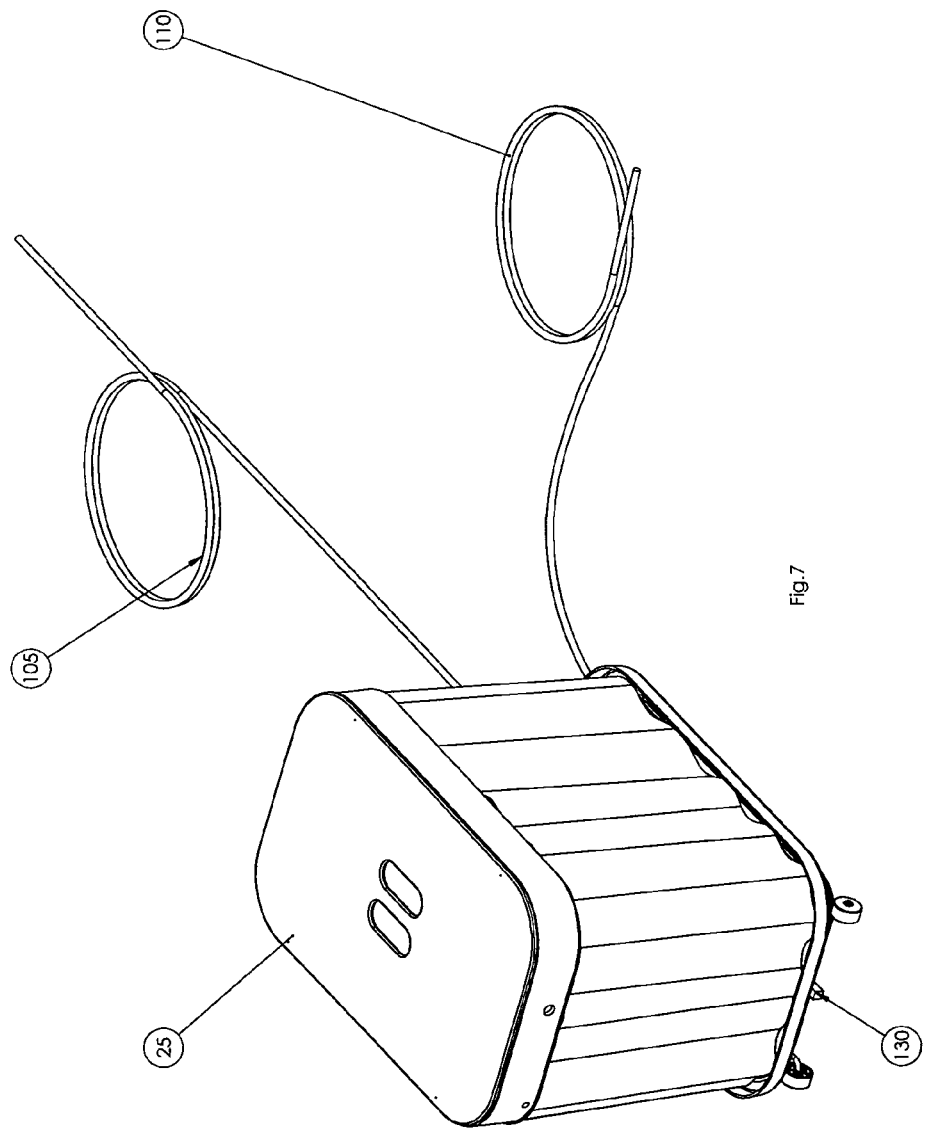
FIG. 7 shows a perspective view of the apparatus of the present invention with the grooming compartment.
Figure 8:
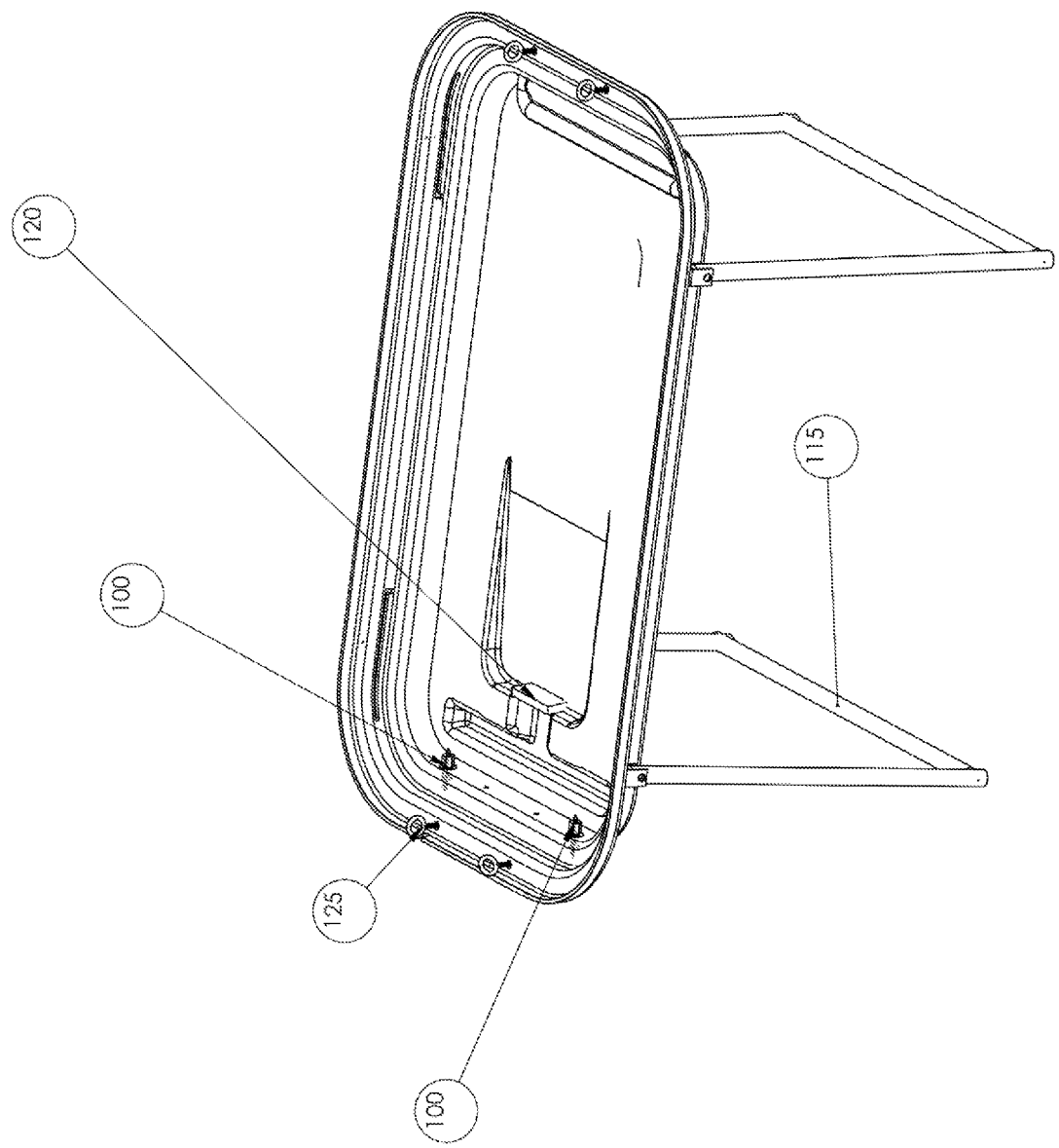
FIG. 8 shows a perspective view of the apparatus of the present invention with the extension legs.
Figure 9:
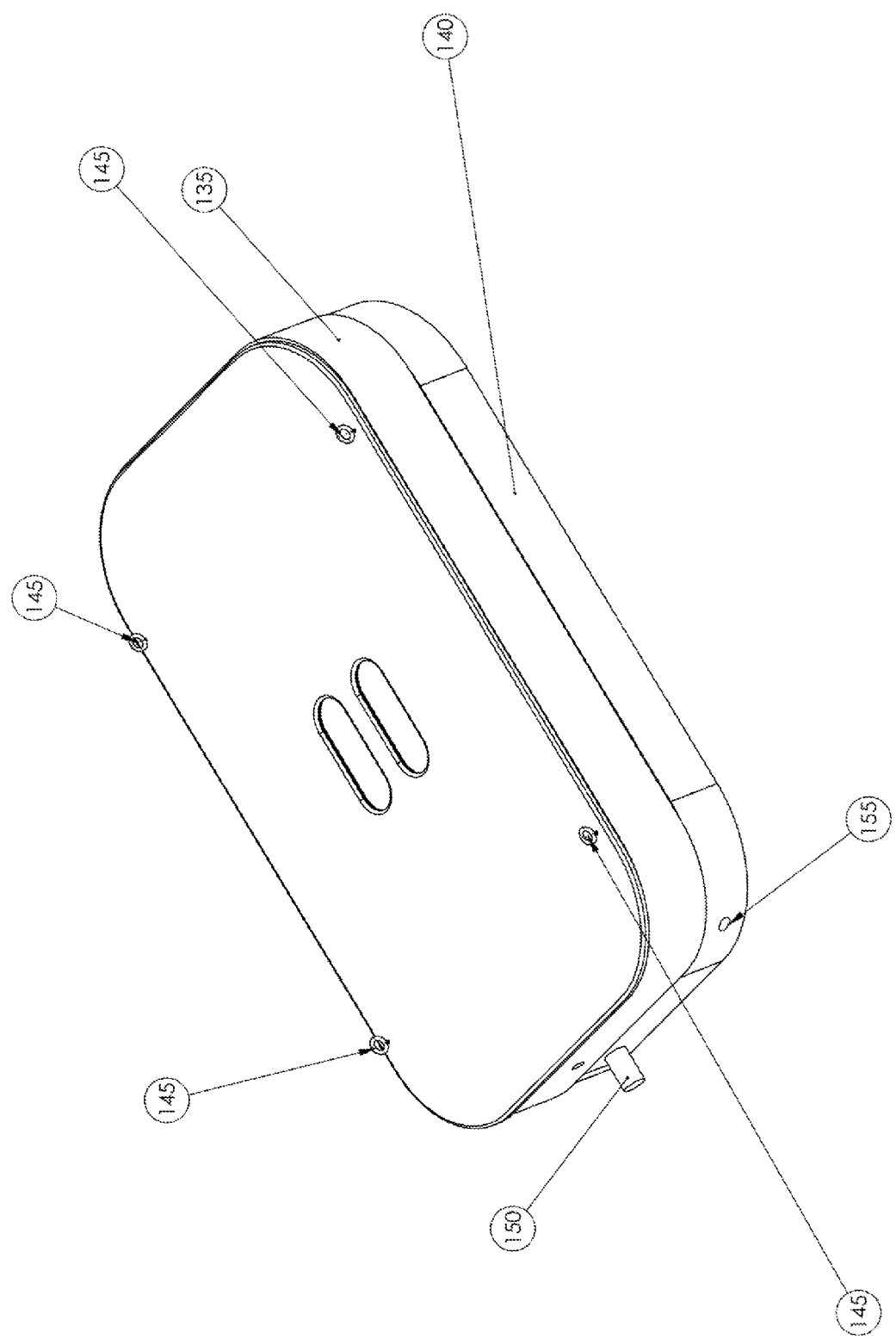
FIG. 9 shows a perspective view of the apparatus with the compartment and top and bottom layer.
Figure 10:
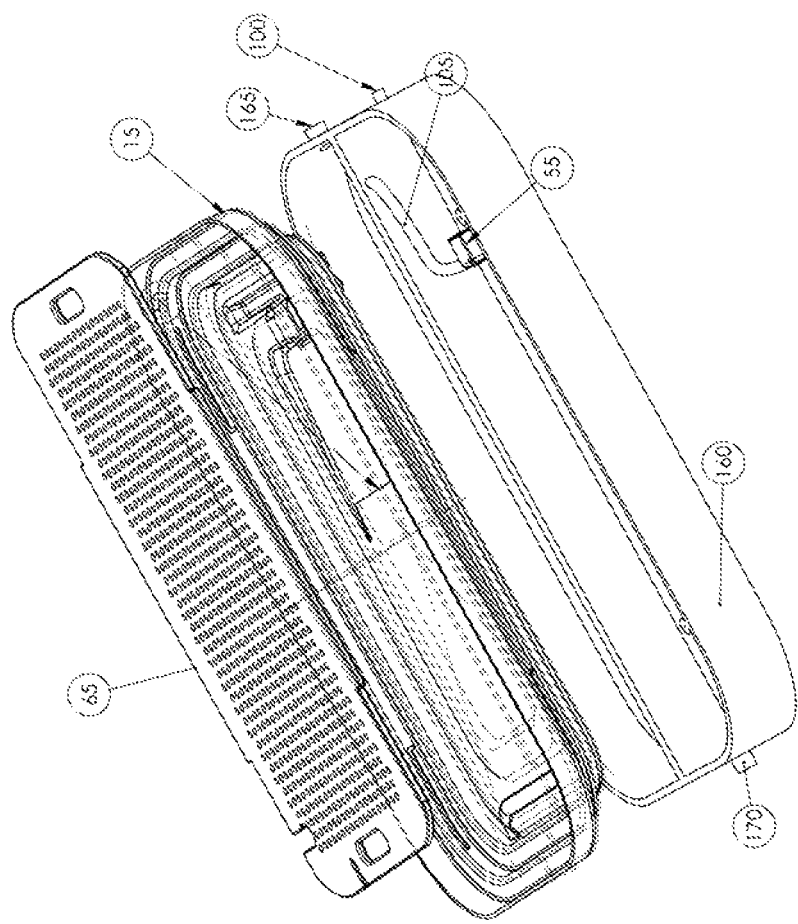
FIG. 10 shows a perspective view of the apparatus with the reservoir.

The side support members 20 and 30 support the top member 25. Side support members 20 and 30 may be attached to the top member 25 via a track in top member 25. Ideally, side support members 20 and 30 are collapsible. The side support members may ride within a track or notches in the base 15, and collapse into the base 15 in a collapsed mode. Ideally, the top member 25 is supported above and parallel to the base 15 in the collapsed mode, as shown in FIG. 5. Top member 25 and the base 15 are approximately the same shape and size so that top member 25 is able to nest within the base 15.

A water dispensing device 35 is disposed above the base 15. The water dispensing device may be any device which is suitable to dispense water in a usable fashion, such as a showering means. For example, a nozzle, a spray nozzle, or even a water outlet of any type may be used. The water dispensing device 35 may be movably or removably mounted below the top member 25.

The top member 25 may be a cover and is divided into a top section 135 and a bottom section 140. The top section 135 functions as a compartment for storage. For example, grooming tools such as a clippers, shampoo or accessories can be stored. Top member 25 sits on side wall 40. The top member 25 may have tie-down rings 145 to allow straps or some other device to be used to help secure a pet for grooming means. Ideally, the top member 25 is detachable and has a handle, or has one or more holes 85 at a center portion to facilitate easy grasping of the top member 25. The top section 135 includes a power source 150 connected to the grooming compartment to allow electricity on the unit. The power source 150 may provide power for devices to aid with grooming an animal. The bottom section 140 incorporates a blower/dryer 155 that can be used to dry a wet animal that has been bathed. For example, the blower/dryer 155 may have either an axial or centrifugal flow with voltages of 12, 18, 24 or 110. The bottom section may also have a vacuum unit to remove loose hair from the apparatus 10 and an animal.

A flexible side wall 40 extends substantially between the top member 25 and the base 15. The flexible side wall 40 helps to prevent water from splashing out of the apparatus 10 during use. Ideally, the flexible side wall 40 is movably and removably mounted on a track on the top member 25 and base 15. The flexible side wall 40 on a track allows for the ingress and egress of an animal. In various embodiments, the side wall 40 is a curtain similar to a shower curtain.

In various preferred embodiments, the side wall 40 is movable and removable, and the side supports 20 and 30 are collapsible and collapse in such a way that the drain tray 65, side supports 20 and 30, and top cover 25 fit into the base 15 in a collapsed mode. One or two holes on each side of the unit 45 are ideally provided in the side wall 40 to allow a user to pass his or her hands through the side wall 40 in order to wash or groom a pet.

A reservoir 160 that separately retains clean and waste water can be attached below the base 15. The base 15 ideally includes a cavity 50 to collect water. The cavity 50 is preferably open to the top. The cavity 50 is connected to the drain tray 65 which directs waste water into the waste side of the reservoir 160. A pump 55 that is in the clean side of the reservoir transports clean water to a water line adapter 100 to a water dispensing device. To fill the clean water side of the reservoir 160 there is a fill cap 170. Waste water can be emptied from the waste side of the reservoir 160 through a waste drain 165.

The apparatus 10 preferably includes a drain tray 65. The drain tray 65 includes drain holes 70 which allow water to pass through a screen 120 to the waste reservoir 160. The screen 120 may be used to filter pet hair from water that goes through the drain tray 65. The drain tray 65 is removably disposed upon the base 15, and is ideally substantially rigid to withhold pressure from the weight of a pet. The base 15 may have tie-down rings 125 to allow straps or some other device to be used to help secure a pet for harnessing means in the apparatus 10. In the collapsed mode, the drain tray 65 fits within the base 15.

The base 15 includes a power source 130 connected to the base 15 to allow electricity on the unit. For example, voltages of 12, 24 or 110-220 may be used. The power source 130 may provide power for devices such as a pump or other tools to aid with grooming an animal. Ideally, the reservoir 160 includes a handle.

The reservoir 160 includes attached extension legs 115 and wheels 95 so that the apparatus 10 can be easily made portable and easily stored in its collapsed mode. The legs may be folded underneath the reservoir 160 manually or with power. The folded legs allow for the height of the apparatus 10 to be raised in order to allow convenience for a user when bathing or grooming a pet.

Thus, the apparatus 10 may be conveniently and efficiently used to wash and groom a pet, and can be collapsed and easily stored. The collapsed apparatus 10 shown in FIG. 5 is highly compact and portable. Parts are also easily cleaned.

While specific embodiments have been illustrated and described, numerous modifications come to mind without significantly departing from the spirit of the invention and the scope of protection is limited by the scope of the accompanying claims.

What is claimed is:

1. A self-contained pet washing and grooming apparatus comprising:
   a base substantially impermeable to water,
   a top member supported above and parallel to said base, further comprising a machine,
   a first and second side support member each including rigid rod supports,
   wherein said rod supports have two ends with a first end connected to and extending from said base, and a second end connected to and substantially supporting said top member,
   wherein said first and second side support members extend diagonally between said base and said top member,
   wherein said side support members are collapsible, and
   wherein said top member and said base are approximately the same shape and size so that the said top member is able to nest within said base.

2. The pet washing and grooming apparatus according to claim 1, wherein said top member has coupling rings.

3. The pet washing and grooming apparatus according to claim 2, wherein said top member is a cover and encloses said apparatus.

4. The pet washing and grooming apparatus according to claim 3, wherein said cover is divided into a top layer and bottom layer.

5. The pet washing and grooming apparatus according to claim 4, wherein said top layer is a compartment.

6. The pet washing and grooming apparatus according to claim 4, wherein said bottom layer is a compartment that has a machine.

7. The pet washing and grooming apparatus according to claim 6, wherein said machine is mounted to bottom layer of compartment.

8. The pet washing and grooming apparatus according to claim 7, wherein said machine further comprises a blower with means for it to operate with variable speeds.

9. The pet washing and grooming apparatus according to claim 8, wherein said blower further comprises radiant heat with variable air flow.

10. The pet washing and grooming apparatus according to claim 6, wherein said machine further comprises a suctorial flow.

11. The pet washing and grooming apparatus according to claim 6, wherein said bottom layer further comprises a power supply.

12. A self-contained pet washing and grooming apparatus comprising:
   a base substantially impermeable to water,
   a top member supported above and parallel to said base, further comprising a reservoir,
   a first and second side support member each including rigid rod supports,
   wherein said rod supports have two ends with a first end connected to and extending from said base, and a second end connected to and substantially supporting said top member,
   wherein said first and second side support members extend diagonally between said base and said top member,
   wherein said side support members are collapsible, and wherein said top member and said base are approximately the same shape and size so that the said top member is able to nest within said base.

13. The pet washing and grooming apparatus according to claim 12, wherein said reservoir is mounted below the base and adapted to separately contain a volume of clean and waste water.

14. The pet washing and grooming apparatus according to claim 13, wherein said base has a cavity that is connected to said drain tray that directs waste water into waste water side of said reservoir.

15. The pet washing and grooming apparatus according to claim 13, further comprising said pump attached to the clean water side of said reservoir.

16. The pet washing and grooming apparatus according to claim 15, wherein said pump discharges clean water to said water line adapter to said water dispensing device.

17. The pet washing and grooming apparatus according to claim 13, wherein said cap fills the clean water side of said reservoir.

18. The pet washing and grooming apparatus according to claim 13, wherein waste water is emptied from waste water side of said reservoir to said waste drain.

19. The pet washing and grooming apparatus according to claim 13, wherein said reservoir further comprises independent support means that fold, and wherein said reservoir further comprises an arm on one end and moves tram so that said apparatus can be folded and dragged on said tram whereby a user can wash and groom a pet in a convenient, sanitary and self-contained unit that is portable and collapsible.

* * * * *